(12) United States Patent
Chokyu et al.

(10) Patent No.: US 10,764,543 B2
(45) Date of Patent: Sep. 1, 2020

(54) IMAGE DISPLAY SYSTEM, IMAGE DISPLAY METHOD, AND MOVABLE OBJECT

(71) Applicant: PANASONIC INTELLECTUAL PROPERTY MANAGEMENT CO., LTD., Osaka (JP)

(72) Inventors: Yukihiro Chokyu, Osaka (JP); Fumihito Inukai, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/366,499

(22) Filed: Mar. 27, 2019

(65) Prior Publication Data
US 2019/0306474 A1    Oct. 3, 2019

(30) Foreign Application Priority Data

Mar. 29, 2018  (JP) ................................ 2018-066195

(51) Int. Cl.
*H04N 9/31* (2006.01)
*G06F 9/30* (2018.01)
*G03B 21/20* (2006.01)

(52) U.S. Cl.
CPC ....... *H04N 9/3129* (2013.01); *G03B 21/2013* (2013.01); *G03B 21/2033* (2013.01); *G03B 21/2066* (2013.01); *G06F 9/30003* (2013.01)

(58) Field of Classification Search
CPC .. G03B 21/28; G03B 21/206; G03B 21/2013; G03B 21/2033; G03B 21/2053; G03B 21/2066; H04N 9/3129; H04N 9/3155; H04N 9/3164; H04N 9/3179; H04N 9/3188; H04N 9/3194
See application file for complete search history.

(56) References Cited

U.S. PATENT DOCUMENTS

| 2006/0044297 | A1* | 3/2006 | Furukawa | H04N 9/3129 345/204 |
|---|---|---|---|---|
| 2008/0225106 | A1 | 9/2008 | Omori et al. | |
| 2009/0059179 | A1* | 3/2009 | Kobori | G03B 21/28 353/52 |

(Continued)

FOREIGN PATENT DOCUMENTS

| JP | 2008-213246 | 9/2008 |
|---|---|---|
| JP | 2012-187811 | 10/2012 |

(Continued)

*Primary Examiner* — Sultan Chowdhury
(74) *Attorney, Agent, or Firm* — Greenblum & Bernstein, P.L.C.

(57) ABSTRACT

The image display system forms an image by scanning with light from a light source of a luminaire. The image display system includes: an input unit configured to receive an image signal indicative of an instruction value of luminance of the light source; and a control unit configured to determine a target value of luminance of the light source based on the instruction value indicated by the image signal received by the input unit. The control unit is configured to perform an adjusting process of setting the target value to an adjusted value different from the instruction value when allowing the light source to emit light based on the image signal.

19 Claims, 6 Drawing Sheets

(56) References Cited

U.S. PATENT DOCUMENTS

| | | | | |
|---|---|---|---|---|
| 2014/0145913 A1* | 5/2014 | Tanahashi | ............ | G03B 21/147 |
| | | | | 345/7 |
| 2017/0118452 A1* | 4/2017 | Ogi | .................... | G02B 26/0833 |
| 2017/0280115 A1* | 9/2017 | Hatagi | ................. | H04N 9/3155 |

FOREIGN PATENT DOCUMENTS

| | | |
|---|---|---|
| JP | 2017-072827 | 4/2017 |
| JP | 2017-078811 | 4/2017 |

\* cited by examiner

IMAGE DISPLAY SYSTEM, IMAGE DISPLAY METHOD, AND MOVABLE OBJECT

CROSS-REFERENCE TO RELATED APPLICATION

The present application is based upon and claims the benefit of priority of Japanese Patent Application No. 2018-066195, filed on Mar. 29, 2018.

TECHNICAL FIELD

The present disclosure generally relates to image display systems, image display methods, and movable objects. In particular, the present disclosure relates to an image display system and an image display method each for displaying an image by scanning with light, and a movable object including the image display system.

BACKGROUND ART

JP 2017-78811 A discloses a laser projection display device (image display system). The laser projection display device of JP 2017-78811 A includes a laser light source, a laser driver for driving the laser light source, and an image processor for supplying an image signal for display to the laser driver.

In JP 2017-78811 A, the laser light source is used. However, different laser light sources tend to have different periods of time necessary for luminance to reach a target value from start of a flow of a drive current (properties of an initial rise of light).

An object would be to propose an image display system, an image display method, and a movable object capable of reducing influence due to initial rise properties of light of a light source.

SUMMARY

An image display system according to one aspect of the present disclosure is an image display system for forming an image by scanning with light from a light source of a luminaire, and includes: an input unit; and a control unit. The input unit is configured to receive an image signal indicative of an instruction value of luminance of the light source. The control unit is configured to determine a target value of luminance of the light source based on the instruction value indicated by the image signal received by the input unit. The control unit is configured to perform an adjusting process of setting the target value to an adjusted value different from the instruction value when allowing the light source to emit light based on the image signal.

An image display method according to one aspect of the present disclosure is an image display method for forming an image by scanning with light from a light source of a luminaire, and includes: a first step; and a second step. The first step is a step of receiving an image signal indicative of an instruction value of luminance of the light source. The second step is a step of setting a target value of luminance of the light source to an adjusted value different from the instruction value indicated by the image signal when allowing the light source to emit light based on the image signal.

A movable object according to one aspect of the present disclosure includes: the image display system according; and a body on which the image display system is installed.

DETAILED DESCRIPTION

1. Embodiments

1.1 Overview

Figure 1:
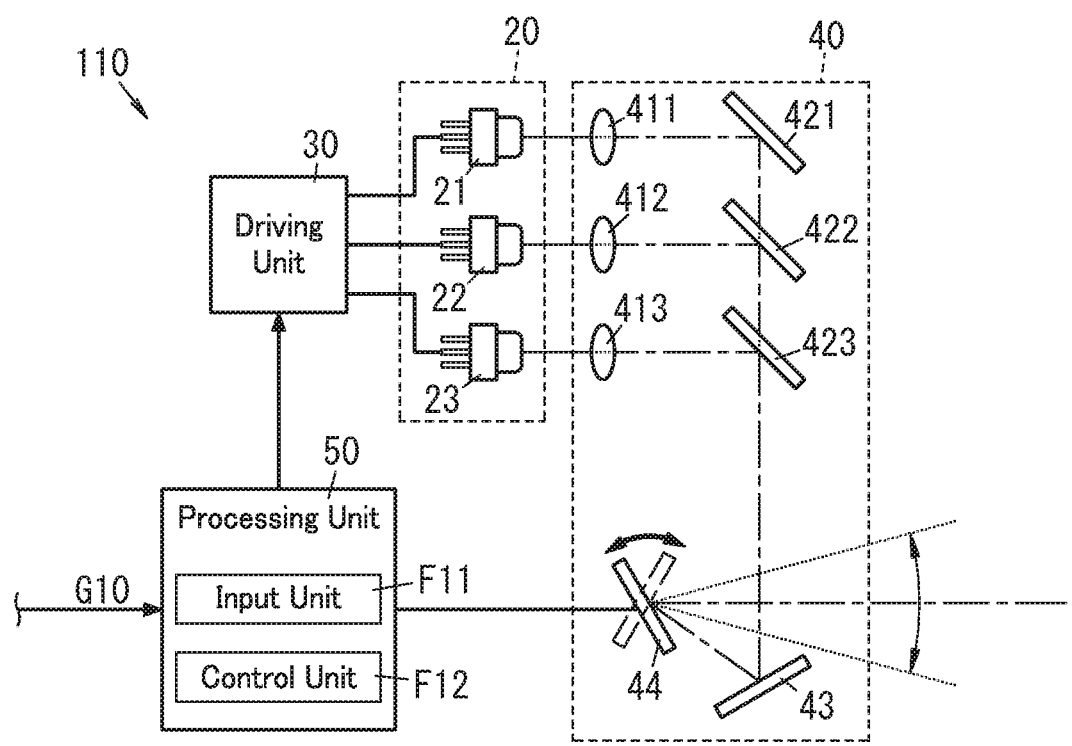
FIG. 1 is a block diagram of an image display system of one embodiment.

FIG. 1 shows an image display system 110 of one embodiment. The image display system 110 is configured to form an image by scanning with light from a light source (a first light source 21, a second light source 22, and a third light source 23) of a luminaire 20. The image display system 110 includes: an input unit F11 configured to receive an image signal (picture signal) G10 indicative of an instruction value of luminance (amount of emitted light) of the light source 21 to 23; and a control unit F12 configured to determine a target value of luminance of the light source 21 to 23 based on the instruction value indicated by the image signal G10 received by the input unit F11. The control unit F12 is configured to perform an adjusting process of setting the target value to an adjusted value different from the instruction value when allowing the light source 21 to 23 to emit light based on the image signal G10.

As described above, the adjusting process sets the target value for allowing the light source 21 to 23 to emit light based on the image signal G10, to not the instruction value but the adjusted value different from the instruction value. Therefore, an initial rise of light of the light source can be made to differ from that in a case where the target value is equal to the instruction value. In other words, the adjusting process enables adjustment of an initial rise of the light source. Consequently, the image display system 110 is capable of reducing influence due to initial rise properties of light of the light source.

1.2 Configuration

Figure 3:
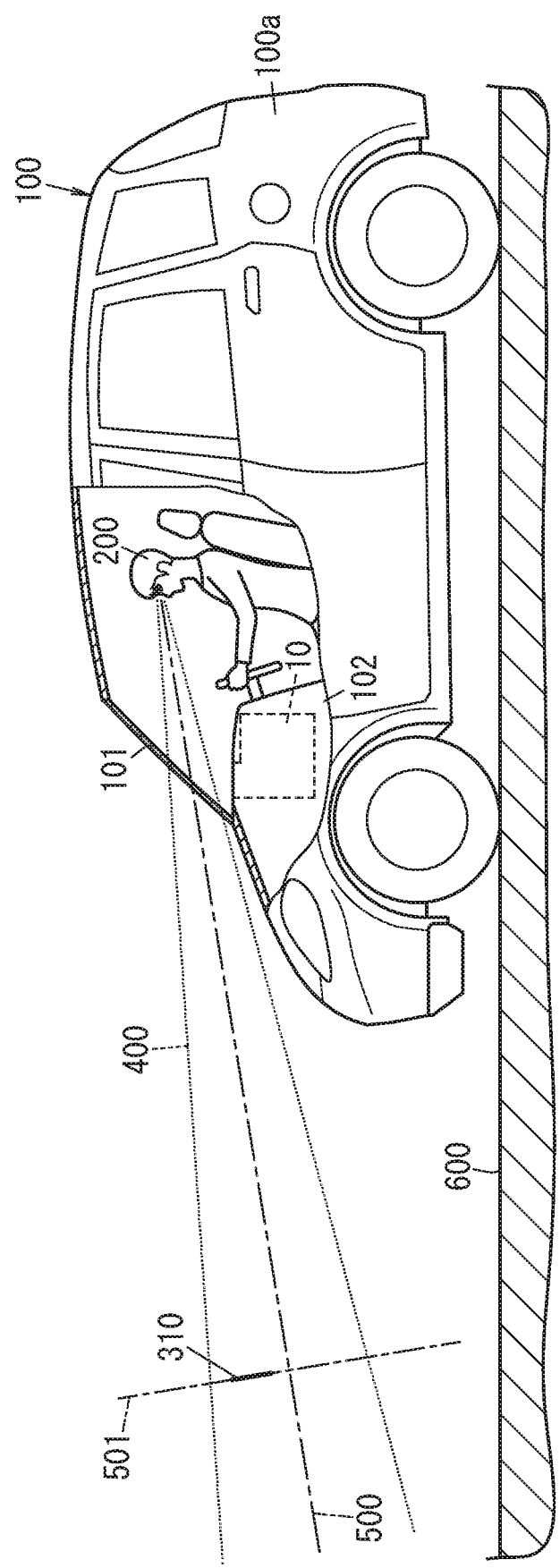
FIG. 3 is a conceptual view of a movable object (automobile) including the above image display system.

Hereinafter, the image display system 110 is described in detail. As shown in FIG. 3, the image display system 110 is used in a display system 10 installed in an automotive body (body) 100a of an automobile (movable object) 100, for example. The display system 10 is a head-up display (HUD), for example. The display system 10 is installed in an interior of the automobile 100 to project an image onto a wind shield 101 of the automotive body 100a of the automobile 100 from below. In FIG. 3, the display system 10 is placed inside a dashboard 102 below the wind shield 101. When an image is projected from the display system 10 onto the wind shield 101, the image reflected from the wind shield 101 serving as a reflective member may be visually perceived by a user 200 (driver). Obviously, the automobile 100 (movable object) includes the display system 10 and the reflective member (in this regard, the window shield 101). The reflective member is light-transmissive and reflects light emitted from the display system 10.

Figure 4:
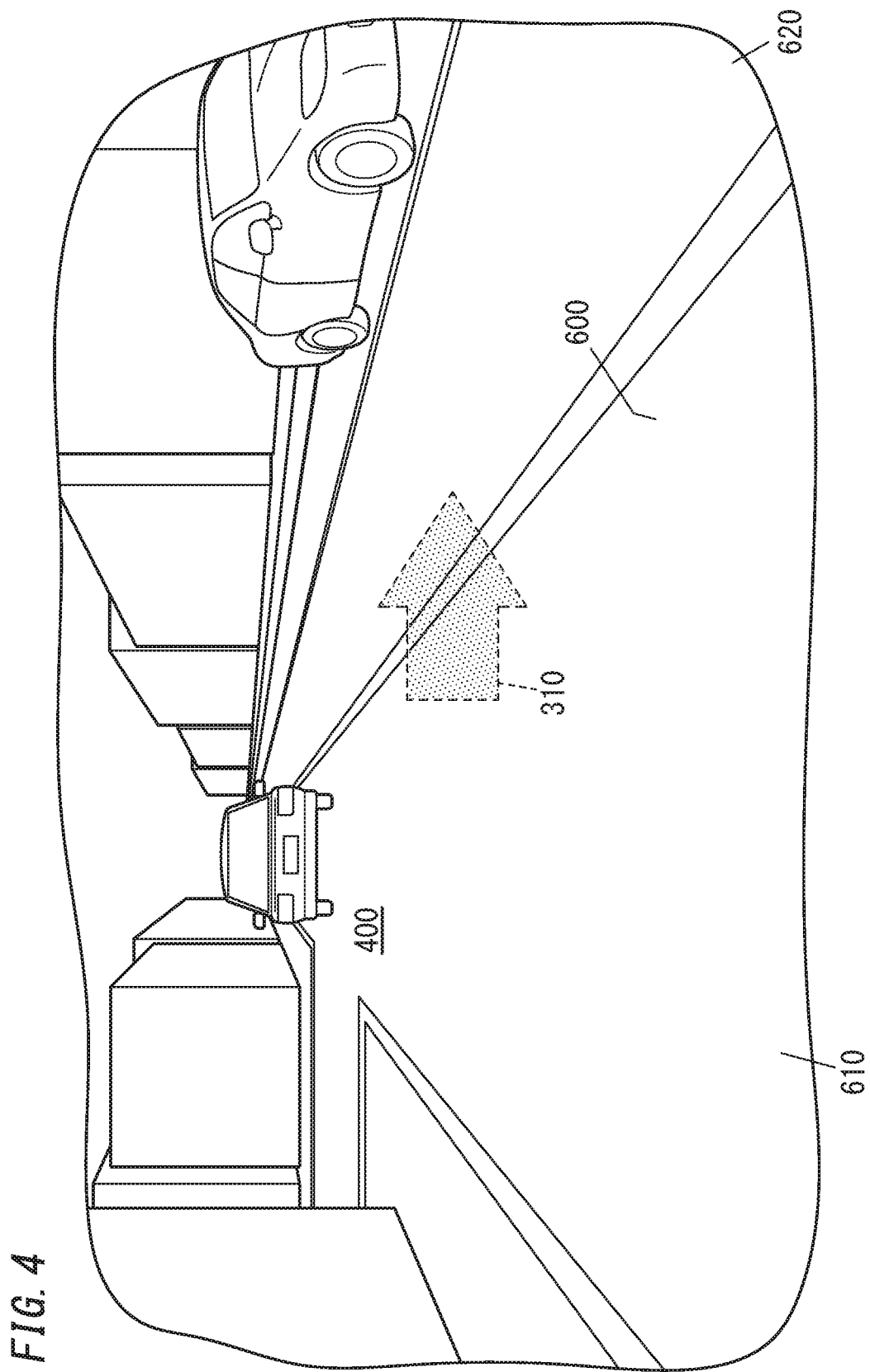
FIG. 4 is a conceptual view of a field of view of a user using the above image display system.

The display system 10 allows the user 200 to visually perceive a virtual image 310 formed in a target space 400 positioned in front of (outside) the automobile 100 over the wind shield 101. In this disclosure, a "virtual image" means an image which is formed by diffused rays of light caused when light emitted from the display system 10 is diffused by a reflective member such as the wind shield 101 and appears as if a real object. Therefore, as shown in FIG. 4, the user 200 can see the virtual image 310 which is formed by the display system 10 and is overlaid on a real space spreading in front of the automobile 100. Accordingly, the display system 10 can display the virtual image 310 indicating various driving assist information such as vehicle speed information, navigation information, pedestrian information, forward vehicle information, lane departure information, and vehicle condition information, and can allow the user 200 to visually perceive it. In FIG. 4, the virtual image 310 indicates navigation information exemplified by an arrow for lane change. Accordingly, when the user 200 trains his or her eyes on a space in front of the wind shield 101, the user 200 can visually obtain the driving assist information by slight movement of a line of his or her sight.

In the display system 10, the virtual image 310 created in the target space 400 is present within an imaginary plane 501 across an optical axis 500 of the display system 10. In the present embodiment, the optical axis 500 extends along a road surface 600 in front of the automobile 100 in the target space 400 in front of the automobile 100. And, the imaginary plane 501 where the virtual image 310 is created is inclined relative to the optical axis 500. An angle of the imaginary plane 501 to the optical axis 500 may not be limited particularly. Alternatively, the imaginary plane 501 may not be necessarily inclined relative to the optical axis 500 but may be perpendicular thereto.

Figure 5:
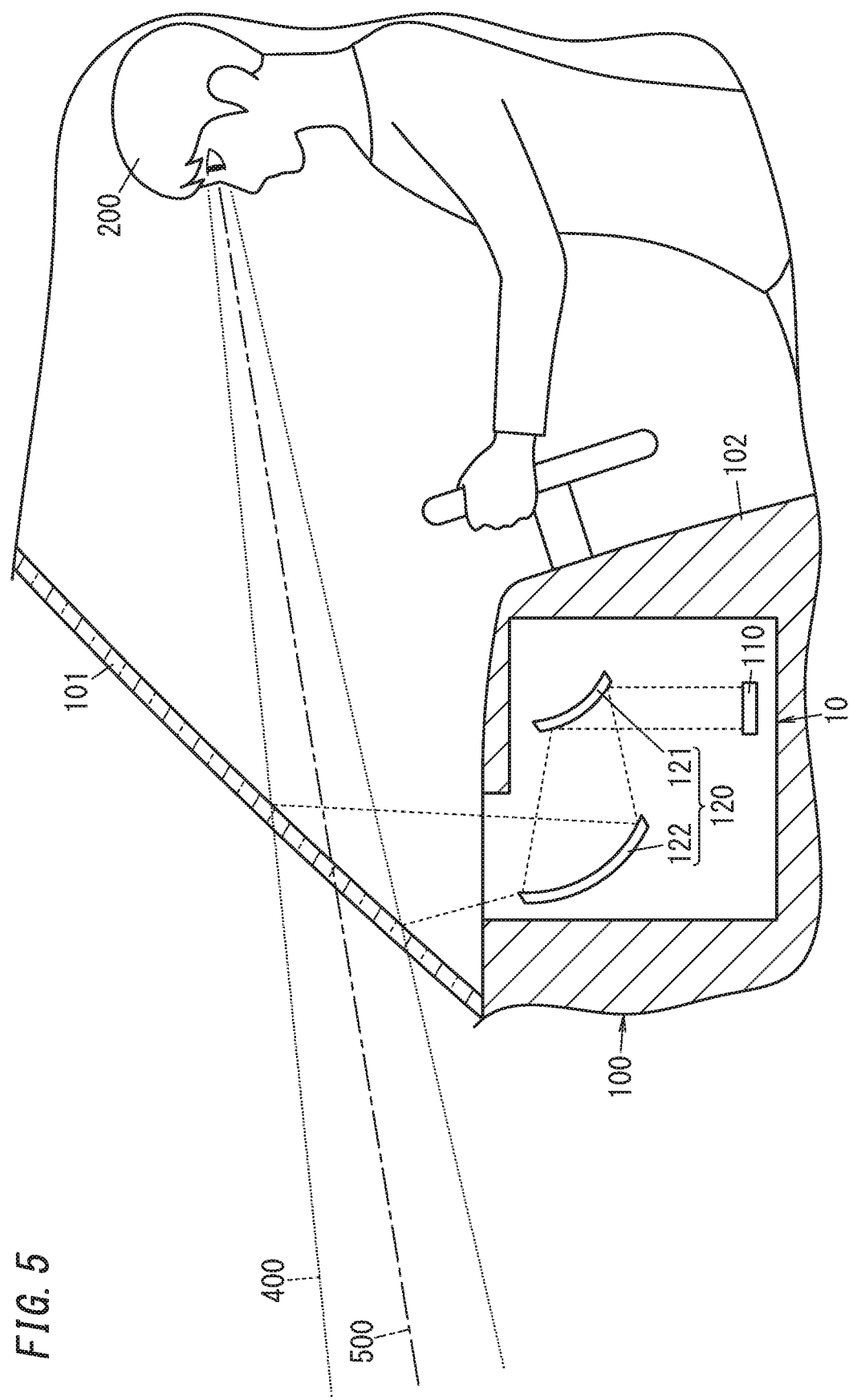
FIG. 5 is an explanatory diagram of a display system including the above image display system.

Next, configuration of the display system 10 is described. As shown in FIG. 5, the display system 10 includes the image display system 110 and a projection unit 120.

As shown in FIG. 1, the image display system 110 includes the luminaire 20, the driving unit 30, an optical system 40, and the processing unit 50.

The luminaire 20 is configured to emit light for forming an image. The luminaire 20 includes a plurality of (three, in the present embodiment) light sources (21 to 23). Hereinafter, if necessary, the light source 21 is referred to as a first light source 21, the light source 22 is referred to as a second light source 22, and the light source 23 is referred to as a third light source 23. Each of the first light source 21, the second light source 22, and the third light source 23 is a laser (e.g., a semiconductor laser) outputting a laser beam. In this regard, the first light source 21 includes a red laser diode outputting a red laser beam. The second light source 22 includes a green laser diode outputting a green laser beam. The third light source 23 includes a blue laser diode outputting a blue laser beam.

The driving unit 30 is a circuit (driving circuit) for driving the plurality of light sources (first to third light sources 21 to 23) of the luminaire 20. In the present embodiment, the light sources are semiconductor lasers and therefore the driving unit 30 includes laser drivers. In detail, the driving unit 30 outputs the drive currents in accordance with the luminance signals (see S11, S12, and S13 in FIG. 2) indicating the target values of the luminance of the light sources given by the processing unit 50, to the light sources to allow the light sources to emit light.

The optical system 40 is used for forming an image by use of light from the luminaire 20. The optical system 40 includes collimation lenses 411, 412, and 413, mirrors 421, 422, and 423, a reflective mirror 43, and a scanning mirror 44. The collimation lenses 411, 412, and 413 are used to collimate light from the light sources 21, 22, and 23, respectively. The mirrors 421, 422, and 423 are used to reflect light which is part of light emitted from the light sources 21, 22, and 23 and passes through the collimation lenses 411, 412, and 413, toward the reflective mirror 43, respectively. The reflective mirror 43 reflects light from the mirrors 421, 422, and 423 toward the scanning mirror 44. The scanning mirror 44 is equipment for performing raster scanning (raster scan) which performs two-dimensional scanning with light. In the present embodiment, the scanning mirror 44 enables scanning with light from the luminaire 20 in two directions which are a horizontal direction (H direction) and a vertical direction (V direction). An example of the scanning mirror 44 may be a MEMS mirror with a two axis rotational mechanism. Alternatively, the scanning mirror 44 may be a polygon mirror. Note that, the optical system 40 may further include a beam splitter. The beam splitter can provide light from the light sources 21, 22, and 23 to photodiodes and therefore allows feedback control based on luminance of the light sources 21, 22, and 23.

The processing unit 50 includes an electric circuit (processing circuit) for controlling the image display system 110. In particular, the processing unit 50 is configured to control the driving unit 30 and the scanning mirror 44. The processing unit 50 controls the driving unit 30 and the scanning mirror 44 in accordance with the given image signal G10 to from an image corresponding to the image signal G10. The processing unit 50 may be realized by a computer system including one or more processors (microprocessors) and one or more memories, for example. Stated differently, one or more processors execute one or more programs stored in one or more memories to function as the processing unit 50. One or more programs may be stored in one or more memories in advance or provided in the form of being stored in one or more non-transitory recording media such as memory cards. Or, the processing unit 50 may be realized by an FPGA (field programmable gate array) and/or an ASIC (application specific integrated circuit).

As shown in FIG. 1, the processing unit 50 includes an input unit F11 and a control unit F12. The input unit F11 and the control unit F12 represent not tangible objects but functions implemented by the processing unit 50.

The input unit F11 is configured to receive the image signal G10 from an external device. The image signal G10 represents data of an image displayed as the virtual image 310. The image signal G10 includes instruction values of luminance of individual pixels constituting an image. In the present embodiment, each pixel is constituted by three colors which are red, green, and blue. Accordingly, the image signal G10 includes instruction values of luminance of three colors of each of pixels constituting an image. In summary, the image signal G10 includes a plurality of instruction values respectively corresponding to the plurality of light sources 21 to 23. For example, when a gradation of luminance is represented in 256 levels, an instruction value is represented by a series of eight bits and has a value ranging from 0 to 255. Note that, examples of the external device may include a navigation system installed in the automobile 100.

Figure 2:
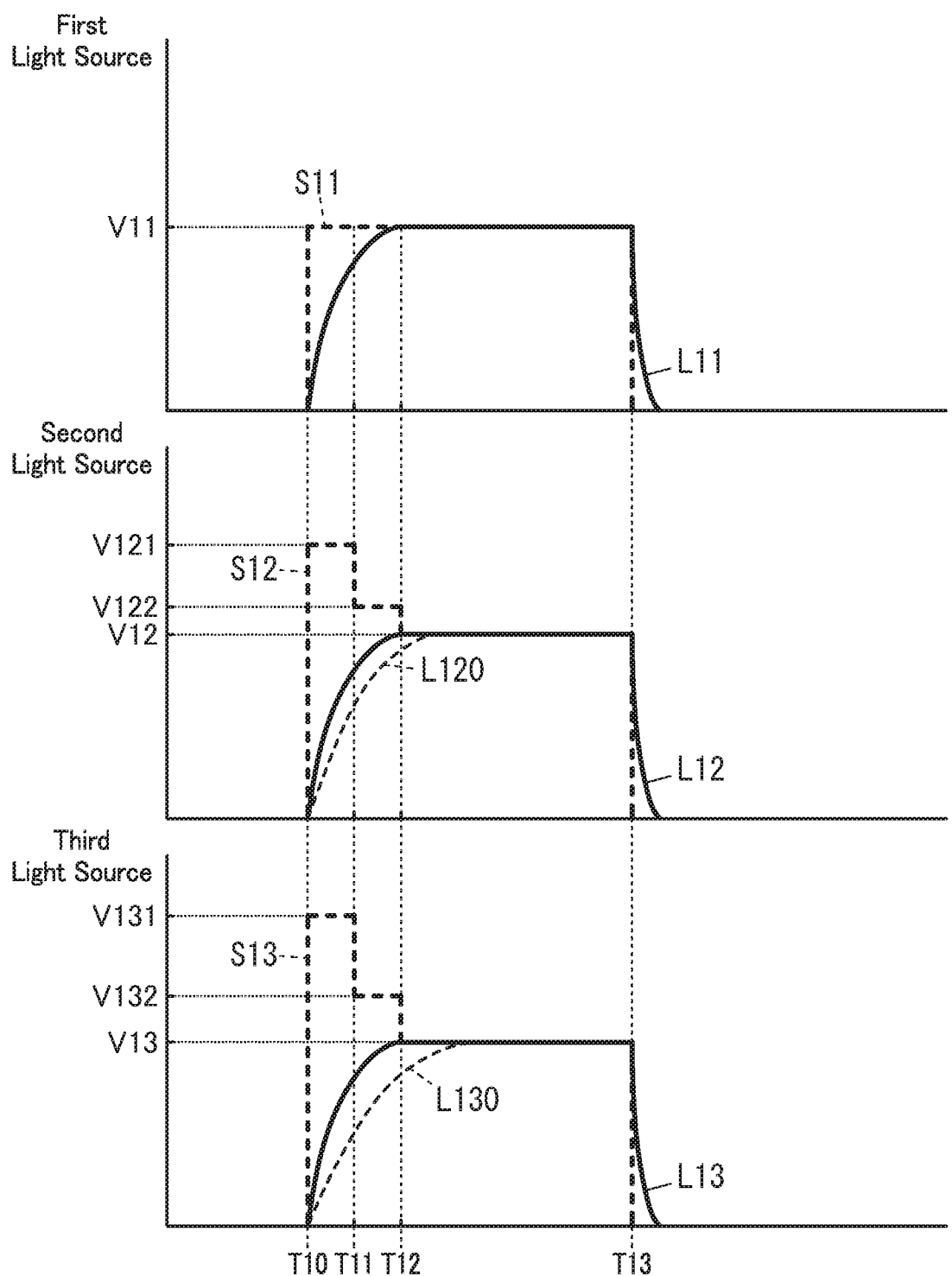
FIG. 2 is an explanatory diagram of operation of the above image display system.

The control unit F12 is configured to determine target values of luminance of light sources based on the instruction values indicated by the image signal G10 received by the input unit F11. In the present embodiment, the control unit F12 determines a target value based on an instruction value indicated by the image signal G10 for each of the light sources 21 to 23. In the present embodiment, the processing unit 50 performs raster scanning by use of the scanning mirror 44, and therefore a constant period of time is allocated to each of pixels constituting an image. Therefore, in relation to a period of time allocated to a particular pixel, the control unit F12 determines a target value based on an instruction value corresponding to the particular pixel. Thus, as shown in FIG. 2, the processing unit 50 generates the luminance signals S11, S12, and S13 indicating luminance of individual light sources from the image signal G10 and provides them to the driving unit 30.

In this regard, the control unit F12 has a function of performing a normal process and an adjusting process. the normal process is a process of setting the target value of luminance of the light source to the instruction value of luminance of the light source indicated by the image signal G10. The adjusting process is a process of setting the target value to the adjusted value different from the instruction value when allowing the light source to emit light based on the image signal G10. In this regard, the adjusted value is larger than the instruction value. The control unit F12 is configured to, in the adjusting process, set the target value to the instruction value when emission of light from the light source continues for a predetermined time period. For example, the control unit F12 allows the light source to emit light when the instruction value is changed from a value corresponding to a light extinction state of the light source to a value corresponding to a light emission state of the light source. For example, gradation of luminance is represented in 256 levels, the value corresponding to the light extinction state of the light source is 0 and the value corresponding to the light emission state of the light source ranges from 1 to 255.

Hereinafter, operation of the control unit F12 is described with reference to FIG. 2. Only for facilitating understanding, FIG. 2 relates to an example in which the image signal G10 requires series of pixels driven in a period of time (from a point of time T10 to a point of time T13) to show white. In this regard, V11 denotes the instruction value of luminance of the first light source 21, V12 denotes the instruction value of luminance of the second light source 22, and V13 denotes the instruction value of luminance of the third light source 23. Of course, in actual cases, the instruction values of luminance of the individual light sources may not be always constant but may vary with regard to series of pixels driven in the period of time (from the point of time T10 to the point of time T13).

In the present embodiment, the control unit F12 performs the normal process for the first light source 21. Hence, the target value of luminance of the first light source 21 is set to the instruction value of luminance of the light source indicated by the image signal G10. For example, as shown in FIG. 2, the control unit F12 generates the luminance signal S11 indicating target luminance of the first light source 21 from the image signal G10 and provides it to the driving unit 30. The luminance signal S11 has its value (the target value) set to the instruction value V11 of the image signal G10. The driving unit 30 outputs the drive current based on the luminance signal S11 to the first light source 21. In FIG. 2, L11 represents change in luminance of the first light source 21.

In contrast, the control unit F12 performs the adjusting process for the second light source 22. Hence, the target value of luminance of the second light source 22 is set to the adjusted value different from the instruction value when the light source is made to emit light based on the image signal G10. For example, as shown in FIG. 2, the control unit F12 generates the luminance signal S12 indicating target luminance of the second light source 22 from the image signal G10 and provides it to the driving unit 30. The luminance signal S12 has its value (the target value) set to an adjusted value V121 different from an instruction value V12 (from the point of time T10 to a point of time T11 in FIG. 2). In this regard, the adjusted value V121 is larger than the instruction value V12. And, the control unit F12 sets the target value to the instruction value V12 when light emission of the second light source 22 continues for a predetermined time period (the point of time T10 to a point of time T12). In relation to this, the predetermined time period is a time period corresponding to an integral multiple of a unit time period corresponding to each one of pixels constituting the image defined by the image signal G10 (e.g., a time period corresponding to five pixels). Further, in the adjusting process, the control unit F12 changes the target value from the adjusted value V121 to the instruction value V12 in a stepwise manner. In FIG. 2, the control unit F12 changes the target value from the adjusted value V121 to a value V122 between the adjusted value V121 and the instruction value V12 and thereafter changes the target value to the instruction value V12. Further, the control unit F12 is configured to change the target value at a timing (the point of time T11) synchronized with the unit time period. Stated differently, the control unit F12 changes the target value in synchronization with a pixel. Therefore, it is possible to reduce change in luminance within a time period associated with the same pixel. Accordingly, luminance of the light source 22 influenced by change in the target value performed in the adjusting process can be made to change inconspicuously. In FIG. 2, L12 denotes change in luminance of the second light source 22 corresponding to the luminance signal S12. L120 denotes change in luminance of the second light source 22 corresponding to a luminance signal in the normal process (i.e., a luminance signal with the target value fixed to the instruction value V12). Comparison between L12 and L120 shows the adjusting process can make an initial rise of light of the light source differ from that in a case where the target value is equal to the instruction value. To sum up, the adjusting process enables adjustment of the initial rise of the light source. In this regard, since the adjusted value V121 is larger than the instruction value V12, the initial rise of the second light source 22 in the adjusting process can be made to be faster than in the normal process.

Further, the control unit F12 performs the adjusting process for the third light source 23. Hence, the target value of luminance of the third light source 23 is set to the adjusted value different from the instruction value when the light source is made to emit light based on the image signal G10. For example, as shown in FIG. 2, the control unit F12 generates the luminance signal S13 indicating target luminance of the third light source 23 from the image signal G10 and provides it to the driving unit 30. The luminance signal S13 has its value (the target value) set to an adjusted value V131 different from an instruction value V13 (from the point of time T10 to the point of time T11 in FIG. 2). In this regard, the adjusted value V131 is larger than the instruction value V13. And, the control unit F12 sets the target value to the instruction value V13 when light emission of the third light source 23 continues for the predetermined time period (the point of time T10 to the point of time T12). Further, in the adjusting process, the control unit F12 changes the target value from the adjusted value V131 to the instruction value V13 in a stepwise manner. In FIG. 2, the control unit F12 changes the target value from the adjusted value V131 to a value V132 between the adjusted value V131 and the instruction value V13 and thereafter changes the target value to the instruction value V13. In FIG. 2, L13 denotes change in luminance of the third light source 23 corresponding to the luminance signal S13. L130 denotes change in luminance of the third light source 23 corresponding to a luminance signal in the normal process (i.e., a luminance signal with the target value fixed to the instruction value V13). Comparison between L13 and L130 shows the adjusting process can make an initial rise of light of the light source differ from that in a case where the target value is equal to the instruction value. To sum up, the adjusting process enables adjustment of the initial rise of the light source. In this regard, since the adjusted value V131 is larger than the instruction value V13, the initial rise of the third light source 23 in the adjusting process can be made to be faster than in the normal process.

As described above, the control unit F12 performs the adjusting processes for the second light source 22 and the third light source 23. However, the adjusting processes for the second light source 22 and the third light source 23 are not same. In the adjusting process, the control unit F12 changes a relation between adjusted values and instruction values in accordance with a wavelength of light emitted from a light source which is one of the plurality of light sources and to which the adjusting process is applied. For example, a semiconductor laser emitting light with a shorter wavelength tends to show a slower initial rise of light. In the present embodiment, the first light source 21 shows a faster initial rise of light than the second light source 22, and the second light source 22 shows a faster initial rise of light than the third light source 23. Hence, relations between adjusted values and instruction values for the second light source 22 and the third light source 23 are determined so that the adjusted value for the third light source 23 is larger than the adjusted value for the second light source 22 in a condition where the instruction value is same. In this regard, the relation between adjusted values and instruction values is set so that an adjusted value for an instruction value increases with decrease in a wavelength of light from a light source. The adjusted value for the second light source 22 and the adjusted value for the third light source 23 are set so that the initial rise of light of the second light source 22 and the initial rise of light of the third light source 23 are made to be close to the initial rise of light of the first light source 21. The adjusted value may be determined based on an initial rise of light of a light source. For example, the adjusted value for a target light source may be determined so that the initial rise of light of the target light source is identical to the initial rise of light of a reference light source.

The control unit F12 performs the adjusting processes so that the initial rise of light of the second light source 22 and the initial rise of light of the third light source 23 are made close the initial rise of light of the first light source 21. Therefore, improvement of color reproducibility can be expected. In contrast, when the adjusting processes are not performed, luminance of the second light source 22 and luminance of the third light source 23 are still insufficient levels even when luminance of the first light source 21 reaches a sufficient level. Therefore, in the extreme sense, pixels appear to show not white but change in color from red to white. Accordingly, the image display system 110 can reduce influence due to differences between initial rise properties of light of light sources emitting light with different wavelengths, and thus improve color reproducibility.

In addition, the control unit F12 is configured not to perform a preliminary light emission process. The preliminary light emission process is a process of allowing the light source 21 to 23 to emit light before allowing the light source 21 to 23 to emit light based on the image signal G10 (i.e., before the point of time T10). In summary, the preliminary light emission process means a process of allowing the light source 21 to 23 to emit light with extremely low luminance in a time period in which the light source 21 to 23 is not allowed to emit light in a normal situation. Performing the preliminary light emission process enables improve of an initial rise response of the light source 21 to 23. However, the light source 21 to 23 emits light in a time period in which the light source 21 to 23 is not allowed to emit light in a normal situation and therefore noise (misadjustment of black level) may occur. Such noise (misadjustment of black level) is likely to influence on visibility at night from the automobile 100. In the present embodiment, the control unit F12 can reduce influence due to initial rise properties by performing the adjusting process and therefore there is no need to perform the preliminary light emission process. Therefore, occurrence of misadjustment of black level due to the preliminary light emission process can be reduced.

In addition, the processing unit 50 generates a horizontal synchronization signal and a vertical synchronization signal from the image signal G10 received by the input unit F11, and provides them to the scanning mirror 44. To sum up, the processing unit 50 generates the luminance signals S11, S12, and S13 indicating luminance of the individual light sources from the image signal G10 and provides them to the driving unit 30, and generates the horizontal synchronization signal and the vertical synchronization signal from the image signal G10 and provides them to the scanning mirror 44. By doing so, the processing unit 50 forms an image corresponding to the image signal G10.

The projection unit 120 is used for projecting the virtual image 310 corresponding to an image formed by the image display system 110 onto the target space 400. As shown in FIG. 5, the projection unit 120 includes a first optical member 121 and a second optical member 122. In other words, the projection unit 120 is an optical system including the first optical member 121 and the second optical member 122. The first optical member 121 reflects light from the image display system 110 (light constituting an image displayed on the display screen) toward the second optical member 122. The second optical member 122 reflects light from the first optical member 121 toward the window shield 101 (see FIG. 5). In summary, the projection unit 120 forms the virtual image 310 in the target space 400 by projecting the image formed by the image display system 110 onto the window shield 101.

As described above, the image display system 110 is capable of reducing influence due to initial rise properties of light of a light source. Particularly, increase in a distance between the luminaire 20 and the driving unit 30 may cause a delay in arrival of the drive current at the light source 21 to 23 and this also may cause a delay in an initial rise of light. However, the image display system 110 is capable of reducing a variation of an initial rise of light of a light source due to the distance between the luminaire 20 and the driving unit 30.

In the image display system 110, the processing unit 50 includes the input unit F11 and the control unit F12. And, the processing unit 50 is implemented by a computer system including one or more processors and one or more memories. Therefore, the processing unit 50 is implemented by one or more processors executing a program (image display program). In other words, the image display program is a computer program enabling a computer system to perform the following image display method. The image display method is a method for forming an image by scanning with light from the light sources 21 to 23 of the luminaire 20 and includes a first step and a second step. The first step is a step of receiving an image signal G10 indicative of an instruction value of luminance of the light source 21 to 23. The second step is a step of setting a target value of luminance of the light source 21 to 23 to an adjusted value different from the instruction value indicated by the image signal G10 when allowing the light source 21 to 23 to emit light based on the image signal G10. In another point of view, the image display program provides, when executed by one or more processors, a first instruction and a second instruction to the one or more processors. The first instruction is an instruction for receiving an image signal G10 indicative of an instruction value of luminance of the light source 21 to 23. The second instruction is an instruction for setting a target value of luminance of the light source 21 to 23 to an adjusted value different from the instruction value indicated by the image signal G10 when allowing the light source 21 to 23 to emit light based on the image signal G10. Accordingly, similarly to the image display system 110, the image display system and the image display program can reduce influence due to initial rise properties of light of a light source.

2. Variations

Embodiments of the present disclosure are not limited to the above embodiment. The above embodiment may be modified in various ways in accordance with design or the like as it can achieve the object of the present disclosure. Hereinafter, variations of the above embodiment are listed.

Figure 6:
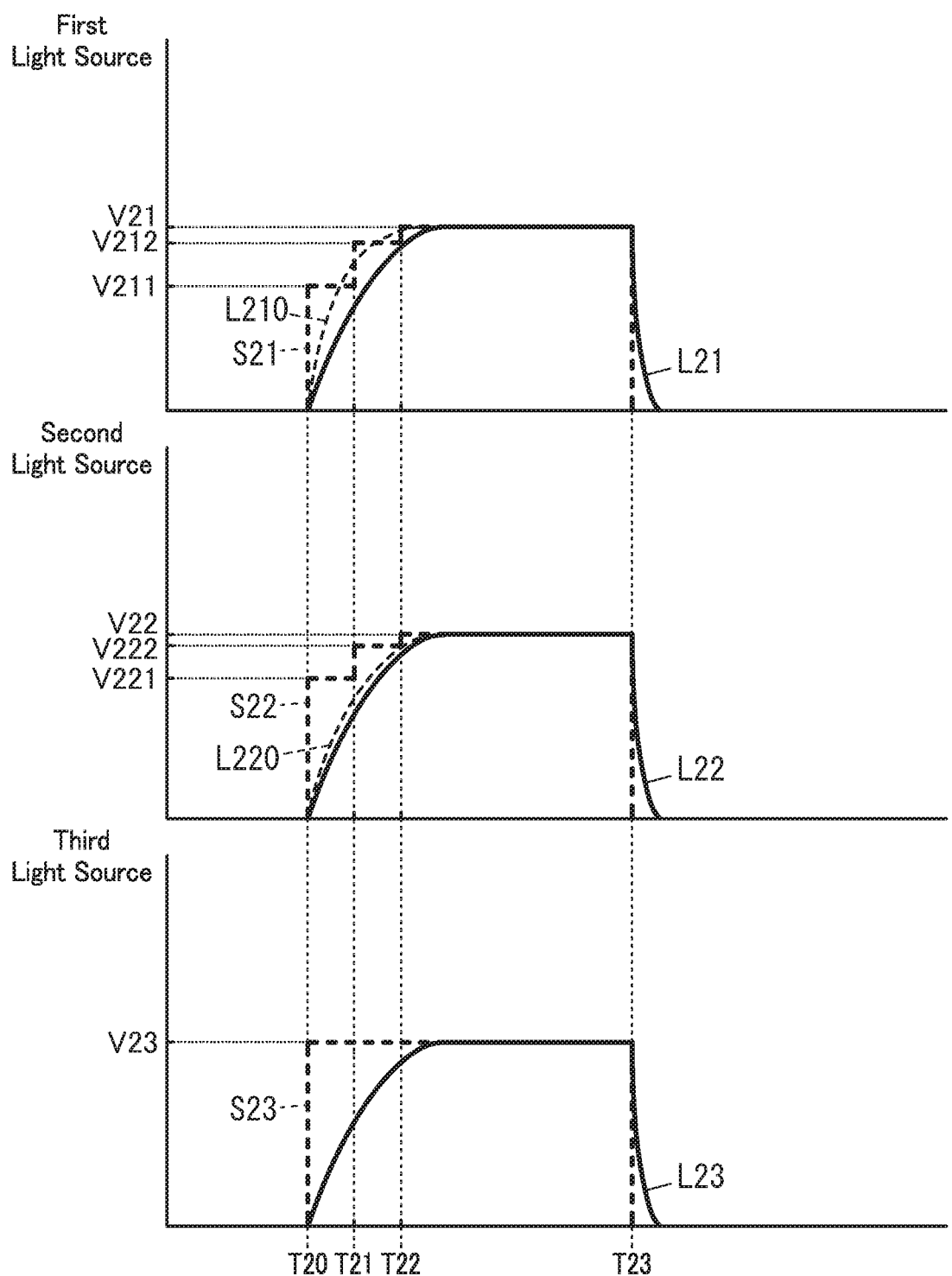
FIG. 6 is an explanatory diagram of operation of a variation of the above image display system.

FIG. 6 shows operation of the control unit F12 of a variation of the image display system 110. Only for facilitating understanding, FIG. 6 relates to an example in which the image signal requires series of pixels driven in a period of time (from a point of time T20 to a point of time T23) to show white. In this regard, V21 denotes the instruction value of luminance of the first light source 21, V22 denotes the instruction value of luminance of the second light source 22, and V23 denotes the instruction value of luminance of the third light source 23. Of course, in actual cases, the instruction values of luminance of the individual light sources may not be always constant but may vary with regard to series of pixels driven in the period of time (from the point of time T20 to the point of time T23).

In this variation, the control unit F12 performs the normal process for the third light source 23. Hence, the target value of luminance of the third light source 23 is set to the instruction value of luminance of the light source indicated by the image signal. For example, as shown in FIG. 6, the control unit F12 generates the luminance signal S23 indicating target luminance of the third light source 23 from the image signal and provides it to the driving unit 30. The luminance signal S23 has its value (the target value) set to the instruction value V23 of the image signal. The driving unit 30 outputs the drive current based on the luminance signal S23 to the third light source 23. In FIG. 6, L23 represents change in luminance of the third light source 23.

In contrast, the control unit F12 performs the adjusting process for the second light source 22. Hence, the target value of luminance of the second light source 22 is set to the adjusted value different from the instruction value when the light source is made to emit light based on the image signal. For example, as shown in FIG. 6, the control unit F12 generates the luminance signal S22 indicating target luminance of the second light source 22 from the image signal and provides it to the driving unit 30. The luminance signal S22 has its value (the target value) set to an adjusted value V221 different from an instruction value V22 (from the point of time T20 to a point of time T21 in FIG. 6). In this regard, the adjusted value V221 is smaller than the instruction value V22. And, the control unit F12 sets the target value to the instruction value V22 when light emission of the second light source 22 continues for a predetermined time period (the point of time T20 to a point of time T22). Further, in the adjusting process, the control unit F12 changes the target value from the adjusted value V221 to the instruction value V22 in a stepwise manner. In FIG. 6, the control unit F12 changes the target value from the adjusted value V221 to a value V222 between the adjusted value V221 and the instruction value V22 and thereafter changes the target value to the instruction value V22. In FIG. 6, L22 denotes change in luminance of the second light source 22 corresponding to the luminance signal S22. L220 denotes change in luminance of the second light source 22 corresponding to a luminance signal in the normal process (i.e., a luminance signal with the target value fixed to the instruction value V22). Comparison between L22 and L220 shows the adjusting process can make the initial rise of light of the light source differ from that in a case where the target value is equal to the instruction value. To sum up, the adjusting process enables adjustment of the initial rise of the light source. In this regard, since the adjusted value V221 is smaller than the instruction value V22, the initial rise of the second light source 22 in the adjusting process can be made to be slower than in the normal process.

Further, the control unit F12 performs the adjusting process for the first light source 21. Hence, the target value of luminance of the first light source 21 is set to the adjusted value different from the instruction value when the light source is made to emit light based on the image signal. For example, as shown in FIG. 6, the control unit F12 generates the luminance signal S21 indicating target luminance of the first light source 22 from the image signal and provides it to the driving unit 30. The luminance signal S21 has its value (the target value) set to an adjusted value V211 different from an instruction value V21 (from the point of time T20 to the point of time T21 in FIG. 6). In this regard, the adjusted value V211 is smaller than the instruction value V21. And, the control unit F12 sets the target value to the instruction value V21 when light emission of the first light source 21 continues for the predetermined time period (the point of time T20 to the point of time T22). Further, in the adjusting process, the control unit F12 changes the target value from the adjusted value V211 to the instruction value V21 in a stepwise manner. In FIG. 6, the control unit F12 changes the target value from the adjusted value V211 to a value V212 between the adjusted value V211 and the instruction value V21 and thereafter changes the target value to the instruction value V21. In FIG. 6, L21 denotes change in luminance of the first light source 21 corresponding to the luminance signal S21. L210 denotes change in luminance of the first light source 21 corresponding to a luminance signal in the normal process (i.e., a luminance signal with the target value fixed to the instruction value V21). Comparison between L21 and L210 shows the adjusting process can make the initial rise of light of the light source differ from that in a case where the target value is equal to the instruction value. To sum up, the adjusting process enables adjustment of the initial rise of the light source. In this regard, since the adjusted value V211 is smaller than the instruction value V21, the initial rise of the first light source 21 in the adjusting process can be made to be slower than in the normal process.

As described above, the control unit F12 performs the adjusting processes for the first light source 21 and the second light source 22. The adjusted values for the first light source 21 and the second light source 22 are set so that the initial rise of light of the first light source 21 and the initial rise of light of the second light source 22 are made to be close to the initial rise of light of the third light source 23. Therefore, improvement of color reproducibility can be expected. In contrast, when the adjusting processes are not performed, luminance of the second light source 22 and luminance of the third light source 23 are still insufficient levels even when luminance of the first light source 21 reaches a sufficient level. Therefore, in the extreme sense, pixels appear to show not white but change in color from red to white. Accordingly, the variation of the image display system 110 can reduce influence due to differences between properties of initial rise of light of light sources emitting light with different wavelengths, and thus improve color reproducibility.

In the embodiment and the variation described above, the control unit F12 performs the adjusting process for each of two of the plurality of light sources 21 to 23. In another variation, the control unit F12 may not perform the adjusting process for the light source 22 but may perform the adjusting processes for two of the light sources 21 and the light source 23. In this case, in the adjusting process for the light sources 21, the adjusted value may be made to be smaller than the instruction value and in the adjusting process for the light sources 23, the adjusted value may be made to be larger than the instruction value. Thereby, the initial rises of the light sources 21 to 23 are made to coincide with each other.

If necessary, the control unit F12 may perform the adjusting process for each of the plurality of light sources 21 to 23. In this case, the adjusted values in the adjusting processes for the plurality of light sources 21 to 23 may be determined so that the initial rises of the plurality of light sources 21 to 23 are identical to each other. Alternatively, the adjusting process may be performed for only one of the plurality of light sources 21 to 23. In summary, the control unit F12 may perform the adjusting process for at least one of the plurality of light sources 21 to 23.

In the adjusting process, whether to make the adjusted value larger or smaller than the instruction value may be determined appropriately. In summary, the control unit F12 may modify a relation between adjusted values and instruction values in accordance with a wavelength of light emitted from a light source which is one of the plurality of light sources and to which the adjusting process is applied.

A light source of the luminaire 20 may not be limited to a laser but may be a light emitting diode (LED).

Colors of light emitted from the plurality of light sources 21 to 23 may not be limited to three colors of red, green and blue. The colors of light may be selected appropriately in accordance with application or the like of the image display system 110. The number of light sources included in the luminaire 20 may not be limited to three but may be two or four or more. Similarly, the number of colors of light may not be limited to three but may be two or four or more. The luminaire 20 may not necessarily include a plurality of light sources 21 to 23 emitting light with different wavelengths. The number of light sources included in the luminaire 20 may be one and similarly the number of colors of light may be one.

The image display system 110 or one or more entities implementing the image display method include a computer system. The computer system includes main hardware components including one or more processors and one or more memories. The one or more processors execute one or more programs recorded in the one or more memories of the computer system, thereby functioning as the system or one or more entities implementing the method in the present disclosure. Such one or more programs may be stored in the one or more memories of the computer system in advance, or may be provided through telecommunication circuits, or may be provided with being recorded in one or more non-transitory recording media readable by computer systems. Examples of the non-transitory recording media readable by computer systems may include memory cards, optical disks, and hard disk drive. A processor of such a computer system may include one or more electronic circuits including a semiconductor integrated circuit (IC) or a large scale integrated circuit (LSI). The electronic circuits may be aggregated into one chip, or distributed to chips. The chips may be aggregated into one device, or distributed to devices. Note that, functions of the processing unit 50 of the image display system 110 may be distributed to two or more systems (devices). Alternatively, one or more of functions of the processing unit 50 may be implemented by the cloud (cloud computing) or one or more servers, for example.

The display system 10 may not be limited to a configuration of forming the virtual image 310 in the target space 400 set in front of a movable object (the automobile 100) in relation to a moving direction thereof. However, the display system 10 may form the virtual image 310 beside, behind, or over the movable object in relation to the moving direction thereof, for example. The display system 10 may apply to not only a head-up display used in the automobile 100 but also a movable object other than the automobile 100, such as a bicycle, a train, an airplane, a construction machine, a boat, and a ship. The display system 10 may not be limited to being used in movable objects but may be used in amusement facilities. The display system 10 may be used in: a wearable terminal such as a head mounted display (HMD); medical equipment; or stationary equipment.

3. Aspects

As obviously understood from the embodiments and variations, the present disclosure contains the following aspects. In the following, the reference signs in parentheses are introduced in order to clearly indicate relation between the aspects and the embodiment and variations.

An image display system (110) of a first aspect is an image display system for forming an image by scanning with light from a light source (21 to 23) of a luminaire (20) and includes an input unit (F11) and a control unit (F12). The input unit (F11) is configured to receive an image signal (G10) indicative of an instruction value of luminance of the light source (21 to 23). The control unit (F12) is configured to determine a target value of luminance of the light source (21 to 23) based on the instruction value indicated by the image signal (G10) received by the input unit (F11). The control unit (F12) is configured to perform an adjusting process of setting the target value to an adjusted value (V120, V130; V210, V220) different from the instruction value (V12, V13; V21, V22) when allowing the light source (21 to 23) to emit light based on the image signal (G10). Accordingly, the first aspect can reduce influence due to initial rise properties of light of the light source (21 to 23).

An image display system (110) of a second aspect would be realized in combination with the first aspect. In the second aspect, the adjusted value (V120, V130; V210, V220) is larger than the instruction value (V12, V13; V21, V22). Accordingly, the second aspect can speed up the initial rise of light of the light source (21 to 23).

An image display system (110) of a third aspect would be realized in combination with the first aspect. In the third aspect, the adjusted value (V120, V130; V210, V220) is smaller than the instruction value (V12, V13; V21, V22). Accordingly, the third aspect can slow the initial rise of light of the light source (21 to 23).

An image display system (110) of a fourth aspect would be realized in combination with any one of the first to third aspects. In the fourth aspect, the light source (21 to 23) is a laser. Accordingly, the fourth aspect can improve quality of the image.

An image display system (110) of a fifth aspect would be realized in combination with any one of the first to fourth aspects. In the fifth aspect, the control unit (F12) is configured to, in the adjusting process, set the target value to the instruction value (V12, V13; V21, V22) when emission of light from the light source (21 to 23) continues for a predetermined time period. Accordingly, the fifth aspect can reduce influence due to initial rise properties of light of the light source (21 to 23).

An image display system (110) of a sixth aspect would be realized in combination with the fifth aspect. In the sixth aspect, the predetermined time period is a time period corresponding to an integral multiple of a unit time period corresponding to each one of pixels constituting the image. Accordingly, the sixth aspect can reduce change in luminance within a time period associated with the same pixel.

An image display system (110) of a seventh aspect would be realized in combination with the sixth aspect. In the seventh aspect, the control unit (F12) is configured to change the target value from the adjusted value (V120, V130; V210, V220) to the instruction value (V12, V13; V21, V22) in a stepwise manner in the adjusting process. Accordingly, the seventh aspect can reduce influence due to initial rise properties of light of the light source (21 to 23).

An image display system (110) of an eighth aspect would be realized in combination with the seventh aspect. In the eighth aspect, the control unit (F12) is configured to change the target value at a timing synchronized with the unit time period. Accordingly, the eighth aspect can reduce change in luminance within a time period associated with the same pixel.

An image display system (110) of a ninth aspect would be realized in combination with any one of the first to eighth aspects. In the ninth aspect, the control unit (F12) is configured not to perform a preliminary light emission process of allowing the light source (21 to 23) to emit light before allowing the light source (21 to 23) to emit light based on the image signal (G10). Accordingly, the ninth aspect can reduce influence due to differences between initial rise properties of light of light sources (21 to 23) yet can reduce occurrence of misadjustment of black level.

An image display system (110) of a tenth aspect would be realized in combination with any one of the first to ninth aspects. In the tenth aspect, the luminaire (20) includes a plurality of the light sources (21 to 23) emitting light with mutually different wavelengths. The image signal (G10) includes a plurality of the instruction values individually corresponding to the plurality of light sources (21 to 23). The control unit (F12) is configured to perform the adjusting process for at least one of the plurality of light sources (21 to 23). Accordingly, the tenth aspect can reduce influence due to differences between initial rise properties of light of light sources (21 to 23).

An image display system (110) of an eleventh aspect would be realized in combination with the tenth aspect. In the eleventh aspect, in the adjusting process, the adjusted value (V120, V130; V210, V220) is determined so that a light source (21 to 23) which is one of the plurality of light sources (21 to 23) and to which the adjusting process is applied shows an initial rise of light corresponding to a reference light source (21 to 23). Accordingly, the eleventh aspect can reduce influence due to differences between initial rise properties of light of light sources (21 to 23).

An image display system (110) of a twelfth aspect would be realized in combination with the eleventh aspect. In the twelfth aspect, the reference light source (21 to 23) is a light source (21 to 23) which is one of the plurality of light sources (21 to 23) and shows a fastest initial rise. Accordingly, the twelfth aspect can reduce influence due to differences between initial rise properties of light of light sources (21 to 23).

An image display system (110) of a thirteenth aspect would be realized in combination with the eleventh aspect. In the thirteenth aspect, the reference light source (21 to 23) is a light source (21 to 23) which is one of the plurality of light sources (21 to 23) and shows a slowest initial rise. Accordingly, the thirteenth aspect can reduce influence due to differences between initial rise properties of light of light sources (21 to 23).

An image display system (110) of a fourteenth aspect would be realized in combination with any one of the eleventh to thirteenth aspects. In the fourteenth aspect, the control unit (F12) is configured to perform, for the reference light source (21 to 23), a normal process of setting the target value to the instruction value (V12, V13; V21, V22) even when allowing the light source (21 to 23) to emit light based on the image signal (G10). Accordingly, the fourteenth aspect can reduce influence due to differences between initial rise properties of light of light sources (21 to 23).

An image display system (110) of a fifteenth aspect would be realized in combination with the tenth aspect. In the fifteenth aspect, the control unit (F12) is configured to perform the adjusting process for each of the plurality of light sources (21 to 23). Accordingly, the fifteenth aspect can reduce influence due to differences between initial rise properties of light of light sources (21 to 23).

An image display system (110) of a sixteenth aspect would be realized in combination with the fifteenth aspect. In the sixteenth aspect, adjusting values (V120, V130; V210, V220) of adjusting processes for the plurality of light sources (21 to 23) are determined so that initial rises of the plurality of light sources (21 to 23) are identical to each other. Accordingly, the sixteenth aspect can reduce influence due to differences between initial rise properties of light of light sources (21 to 23).

An image display system (110) of a seventeenth aspect would be realized in combination with any one of the tenth to sixteenth aspects. In the seventeenth aspect, the control unit (F12) is configured to, in the adjusting process, change a relation between adjusted values (V120, V130; V210, V220) and instruction values (V12, V13; V21, V22) in accordance with a wavelength of light emitted from a light source which is one of the plurality of light sources (21 to 23) and to which the adjusting process is applied. Accordingly, the seventeenth aspect can reduce influence due to differences between initial rise properties of light of light sources (21 to 23).

An image display system (110) of an eighteenth aspect would be realized in combination with the seventeenth aspect. In the eighteenth aspect, the relation is set so that an adjusted value (V120, V130; V210, V220) for an instruction value (V12, V13; V21, V22) increases with decrease in a wavelength of light from a light source (21 to 23). Accordingly, the eighteenth aspect can reduce influence due to differences between initial rise properties of light of light sources (21 to 23).

An image display method of a nineteenth aspect is an image display method for forming an image by scanning with light from a light source (21 to 23) of a luminaire (20) and includes a first step and a second step. The first step is a step of receiving an image signal (G10) indicative of an instruction value of luminance of the light source (21 to 23). The second step is a step of setting a target value of luminance of the light source (21 to 23) to an adjusted value (V120, V130; V210, V220) different from the instruction value (V12, V13; V21, V22) indicated by the image signal (G10) when allowing the light source (21 to 23) to emit light based on the image signal (G10). Accordingly, the nineteenth aspect can reduce influence due to initial rise properties of light of the light source (21 to 23).

An image display program of a twentieth aspect is a program for enabling a computer system to implement the image display method of the nineteenth aspect. Accordingly, the twentieth aspect can reduce influence due to initial rise properties of light of the light source (21 to 23).

A movable object (100) of a twenty-first aspect includes: the image display system (110) according to any one of the first to eighteenth aspects; and a body (100a) on which the image display system (110) is installed. Accordingly, the twenty-first aspect can reduce influence due to initial rise properties of light of the light source (21 to 23).

While various embodiments have been described herein above, it is to be appreciated that various changes in form and detail may be made without departing from the spirit and scope of the present disclosure presently or hereafter claimed.

The entire contents of Japanese Patent Application No. 2018-066195 mentioned above are incorporated by reference.

The invention claimed is:

1. An image display system for forming an image by scanning with light from a light source of a luminaire, the system comprising:
an input circuit configured to receive an image signal indicative of an instruction value of luminance of the light source; and
a control circuit configured to determine a target value of luminance of the light source based on the instruction value indicated by the image signal received by the input circuit,
the control circuit being configured to perform an adjusting process of setting the target value to an adjusted value different from the instruction value when allowing the light source to emit light based on the image signal, wherein:
the luminaire includes a plurality of light sources emitting light with different wavelengths;
at least one of the plurality of light sources having an adjusted value different from one or more adjusted values of other light sources among the plurality of light sources;
the image signal includes a plurality of the instruction values individually corresponding to each of the plurality of light sources; and
the control circuit is configured to perform the adjusting process for the at least one of the plurality of light sources so that an initial rise of light of each of the plurality of light sources is made to be close to one another.

2. The image display system according to claim 1, wherein
the adjusted value is larger than the instruction value.

3. The image display system according to claim 1, wherein
the adjusted value is smaller than the instruction value.

4. The image display system according to claim 1, wherein
the light source is a laser.

5. The image display system according to claim 1, wherein
the control circuit is configured to, in the adjusting process, set the target value to the instruction value when emission of light from the light source continues for a predetermined time period.

6. The image display system according to claim 5, wherein
the predetermined time period is a time period corresponding to an integral multiple of a unit time period corresponding to each one of pixels constituting the image.

7. The image display system according to claim 6, wherein
the control circuit is configured to change the target value from the adjusted value to the instruction value in a stepwise manner in the adjusting process.

8. The image display system according to claim 7, wherein
the control circuit is configured to change the target value at a timing synchronized with the unit time period.

9. The image display system according to claim 1, wherein
the control circuit is configured not to perform a preliminary light emission process of allowing the light source to emit light before allowing the light source to emit light based on the image signal.

10. The image display system according to claim 1, wherein
in the adjusting process, the adjusted value is determined so that a light source which is one of the plurality of light sources and to which the adjusting process is applied shows an initial rise of light corresponding to a reference light source.

11. The image display system according to claim 10, wherein
the reference light source is a light source which is one of the plurality of light sources and shows a fastest initial rise.

12. The image display system according to claim 10, wherein
the reference light source is a light source which is one of the plurality of light sources and shows a slowest initial rise.

13. The image display system according to claim 10, wherein
the control circuit is configured to perform, for the reference light source, a normal process of setting the target value to the instruction value even when allowing the light source to emit light based on the image signal.

14. The image display system according to claim 1, wherein
the control circuit is configured to perform the adjusting process for each of the plurality of light sources.

15. The image display system according to claim 14, wherein
adjusting values of adjusting processes for the plurality of light sources are determined so that initial rises of the plurality of light sources are identical to each other.

16. The image display system according to claim 1, wherein
the control circuit is configured to, in the adjusting process, change a relation between adjusted values and instruction values in accordance with a wavelength of light emitted from a light source which is one of the plurality of light sources and to which the adjusting process is applied.

17. The image display system according to claim 16, wherein
the relation is set so that an adjusted value for an instruction value increases with decrease in a wavelength of light from a light source.

18. A movable object comprising:
the image display system according to claim 1; and
a body on which the image display system is installed.

19. An image display method for forming an image by scanning with light from a light source of a luminaire, the method comprising:

receiving an image signal indicative of an instruction value of luminance of the light source; and setting a target value of luminance of the light source to an adjusted value different from the instruction value indicated by the image signal when allowing the light source to emit light based on the image signal, wherein:
the luminaire includes a plurality of light sources emitting light with different wavelengths;

at least one of the plurality of light sources having an adjusted value different from one or more adjusted values of other light sources among the plurality of light sources;

the image signal includes a plurality of the instruction values individually corresponding to each of the plurality of light sources; and the control circuit is configured to perform the adjusting process for the at least one of the plurality of light sources so that an initial rise of light of each of the plurality of light sources is made to be close to one another.

* * * * *